United States Patent [19]

Yamano et al.

[11] Patent Number: 5,526,334

[45] Date of Patent: Jun. 11, 1996

[54] INFORMATION PROCESSING APPARATUS WITH MULTIPLE PROBES AND METHOD THEREFOR

[75] Inventors: Akihiko Yamano, Sagamihara; Katsunori Hatanaka, Yokohama; Kunihiro Sakai, Isehara; Takahiro Oguchi, Yamato; Sunichi Shido, Sagamihara, all of Japan

[73] Assignee: Canon Kabushiki Kaisha, Tokyo, Japan

[21] Appl. No.: 431,738

[22] Filed: May 1, 1995

Related U.S. Application Data

[63] Continuation of Ser. No. 168,995, Dec. 20, 1993, abandoned.

[30] Foreign Application Priority Data

Dec. 24, 1992 [JP] Japan ..................... 4-343753

[51] Int. Cl.$^6$ ..................................... G11B 7/00
[52] U.S. Cl. .................. 369/53; 369/44.26; 369/126
[58] Field of Search ................ 369/44.26, 44.28, 369/44.29, 47–48, 50, 101, 126, 53, 54, 58; 250/306, 307, 310, 311, 423 F, 442.11

[56] References Cited

U.S. PATENT DOCUMENTS

| | | | |
|---|---|---|---|
| 4,829,507 | 5/1989 | Kazan et al. | 369/126 |
| 4,878,213 | 10/1989 | Kazan et al. | 369/126 |
| 4,907,195 | 3/1990 | Kazan et al. | 365/118 |
| 5,255,259 | 10/1993 | Hatanaka et al. | 369/126 |
| 5,299,184 | 3/1994 | Yamano et al. | 369/44.28 |
| 5,329,122 | 7/1994 | Sakai et al. | 250/306 |
| 5,329,513 | 7/1994 | Nose et al. | 369/126 |

FOREIGN PATENT DOCUMENTS

| | | |
|---|---|---|
| 63-161552 | 7/1988 | Japan . |
| 63-161553 | 7/1988 | Japan . |
| 1-107341 | 4/1989 | Japan . |
| 1-133239 | 5/1989 | Japan . |
| 1-196751 | 8/1989 | Japan . |

OTHER PUBLICATIONS

Patent Abstracts of Japan, vol. 17, No. 471, (p. 1601), Aug. 26, 1993, & JP5–109130.

Primary Examiner—W. R. Young
Attorney, Agent, or Firm—Fitzpatrick, Cella, Harper & Scinto

[57] ABSTRACT

An information processing apparatus for effecting at least one of the recording and reproduction of information with probes on a recording medium having tracking grooves is disclosed. In the apparatus, a probe head having plural probes is moved relative to the recording medium, a signal based on a physical phenomenon between each probe and the recording medium is detected from each probe, a position signal indicating a position of the tracking groove is extracted from the detected signal, a reference clock signal is generated, and a start timing of reproduction or recording of the information is determined based on the phase relationship between the position signal and the reference clock signal.

11 Claims, 5 Drawing Sheets

FIG. 2A  DETECTED SIGNAL
FIG. 2B  INFORMATION SIGNAL
FIG. 2C  POSITION SIGNAL
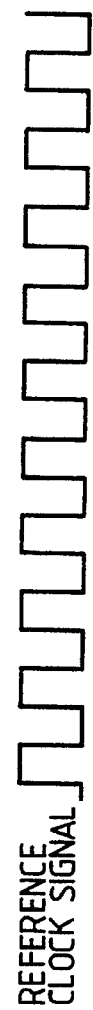
FIG. 2D  REFERENCE CLOCK SIGNAL
FIG. 2E  DETECTED SIGNAL FIG. 3
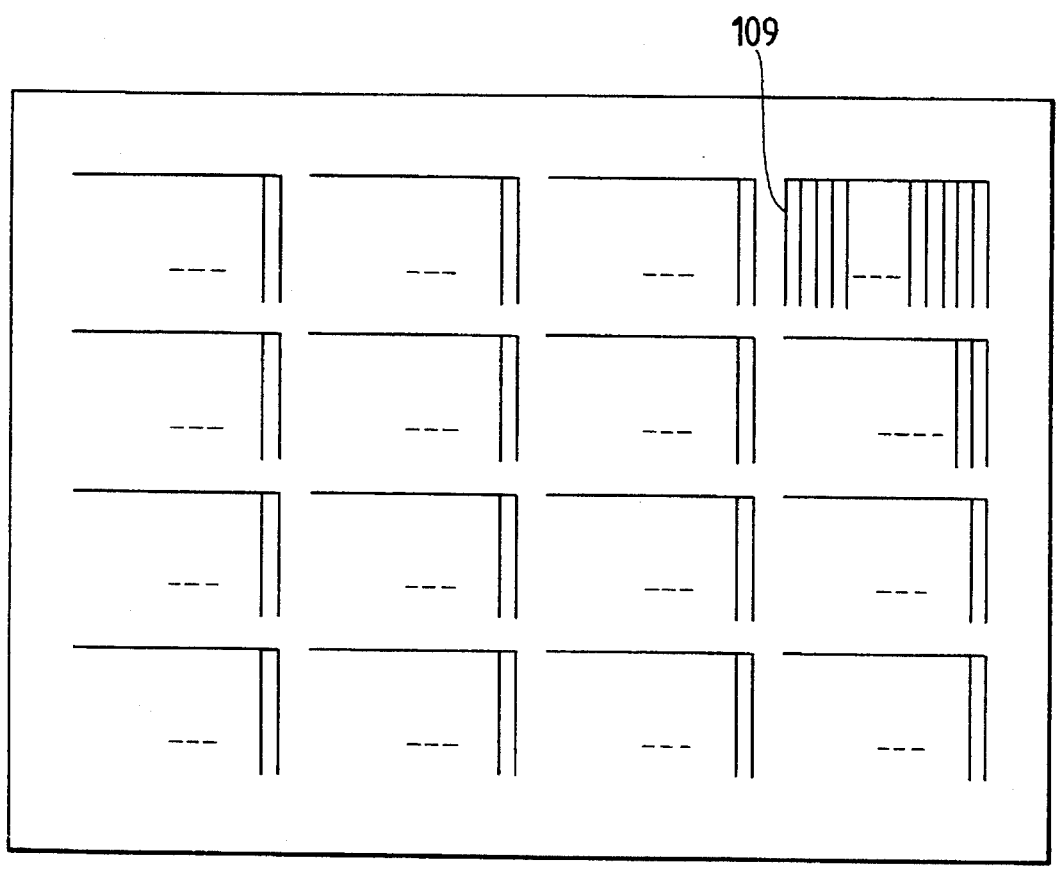
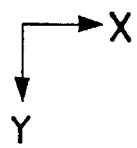

INFORMATION PROCESSING APPARATUS WITH MULTIPLE PROBES AND METHOD THEREFOR

This application is a continuation of application Ser. No. 08/168,995 filed on Dec. 20, 1993, now abandoned.

BACKGROUND OF THE INVENTION

1. Field of the Invention

The present invention relates to an information processing apparatus for effecting writing or reading-out of information by physical interaction of plural probes and a recording medium, and a method therefor.

2. Related Background Art

Recently, scanning tunnelling microscope (hereinafter referred as STM) [G. Binnig et al., Phys. Rev. Lett., 49, 57 (1982)] capable of directly observing electron structure of surfacial atoms of a conductive material has been developed, thus the measurement of the real space image is possible with a high resolving power, both in the monocrystalline and amorphous substances.

The STM is based on a phenomenon that a tunnelling current is generated by Tunnelling effect when a metal probe (probe electrode) and a conductive substance are brought to a small distance in the order of 1 nm, with a voltage applied therebetween. The current is extremely sensitive to the variation in a distance between them. By moving the probe in scanning motion, while maintaining the tunnelling current constant, there can be read various information concerning the entire electronic cloud in the real space. In this case the resolving power in the direction along the surface of the substance is in the order of 0.1 nm.

Consequently, the principle of the STM sufficiently enables information recording and read-out of a high density in the atomic (sub nanometer) order. For example, the Japanese Patent Laid-open Application No. 61-80536 discloses a recording/reproducing apparatus which records information by removing atomic particles absorbed on the surface of a medium by means of an electron beam or the like and reproduces the recorded data by STM.

Also there are proposed methods of effecting the data recording and reproduction by the STM, utilizing a thin film of a material having a memory effect for the current-voltage switching characteristics, such as an organic compound having $\pi$-electrons or a chalcogenide compound (Japanese Patent Laid-open Application Nos. 63-161552 and 63-161553). This method enables recording and reproduction of a large capacity as large as $10^{12}$ bit/cm$^2$ for a recording pit size of 10 nm. Also for the purpose of miniaturization, there is proposed an apparatus of forming plural probes on a semiconductor substrate and achieving the recording by displacing a recording medium opposed thereto (Japanese Patent Laid-open Application No. 1-196751). For example, a combination of a multiple probe head having 2,500 probes arranged in a 50 ×50 matrix on a silicon chip of 1 cm$^2$ and a material having the above-mentioned memory effect can achieve recording and reproduction of digital data of 400 M bits per probe, or 1 terabits in total.

On the other hand, in the conventional information recording/reproducing apparatus utilizing the principle of STM, there has been given relatively little consideration on the position control (tracking) of the 10 probe, serving as recording-reproducing pickup, on the recording medium. For this purpose, for example, there has been proposed a method of forming a tracking groove or embedding a tracking line on the recording medium, and causing the probe to scan the recording medium to effect the recording and reproduction (Japanese Patent Laid-open Application Nos. 1-107341 and 1-133239).

However, there have been present following drawbacks in the information processing in the recording and reproduction by combining a multi-probe head having plural probes and a recording medium opposed thereto.

In case of information recording on a medium with a multi-probe head, the information of a series is distributed among plural heads in order to achieve high-speed recording. Also the reproduction is achieved by converting the data, reproduced in parallel by plural heads, into serial data.

Also the medium is provided with a tracking groove, and the timing of recording or reproduction is determined by the timing of detection of the tracking groove.

However, in case of a multi-probe head, the timings of detection of the tracking groove by the probes are different for example by the expansion or contraction, such as thermal expansion, of the probes or by fluctuation in the precision of preparation of 10 the tracking groove. Consequently, if the detection timing of a certain probe is utilized for determining the timings of recording or reproduction of other probes, there will result in drawbacks of deteriorated precision in the conversion of the parallel reproduced data into serial data, or mutually unaligned record start positions among the probes, leading to the deteriorated precision in the conversion.

SUMMARY OF THE INVENTION

In consideration of the foregoing, the object of the present invention is to provide an information processing apparatus provided with multiple probes, capable of determining the record start timing of each probe relative to the tracking groove without being influenced by the aberration in time of the detection timing of the tracking groove in each probe, and also capable of avoiding deterioration in the precision in the conversion of the parallel reproduced data into the serial data, and a method therefor.

The above-mentioned object can be attained, according to the present invention, by an information processing apparatus for effecting at least one of recording and reproduction of information with a probe on a recording medium having tracking groove is provided with:

a probe head having plural probes;

moving means for moving said probe head relative to said recording medium;

signal detection means for detecting a signal, from each of said probes, based on a physical phenomenon between said each probe and said recording medium;

extraction means for extracting a position signal, indicating the position of said tracking groove, from the detected signal;

reference clock generation means for generating a reference clock signal; and timing determination means for determining the start timing of reproduction or recording of said information in each of said probes, based on the phase relationship between said position signal and said reference clock signal.

Also said object can be attained by an information processing method for effecting at least either of recording and reproduction of information with probes on a recording medium having tracking grooves, comprising steps of:

moving a probe head having plural probes relative to said recording medium;

detecting, from each of said probes, a signal based on a physical phenomenon between said each probe and said recording medium;

extracting a position signal, indicating the position of said tracking groove, from the detected signal;

generating a reference clock signal; and determining the timing of start of reproduction or recording of said information in each of said probes, from the phase relationship between said position signal and said reference clock signal.

BRIEF DESCRIPTION OF THE DRAWINGS

FIG. 2A is a chart showing an example of the detection signal obtained, at the reproduction, from each of the probes shown in FIG. 1;

FIG. 2B is a chart showing information signal extracted from the detection signal shown in FIG. 2A;

FIG. 2C is a chart showing position signal extracted from the information signal shown in FIG. 2B;

FIG. 2D is a chart showing reference clock signal;

FIG. 2E is a chart showing an example of the detection signal obtained, at the recording, from each of the probes shown in FIG. 1;

FIG. 3 is a view showing formation pattern of the tracking grooves in the recording medium to be employed in the present invention;

DESCRIPTION OF THE PREFERRED EMBODIMENTS

Figure 1:
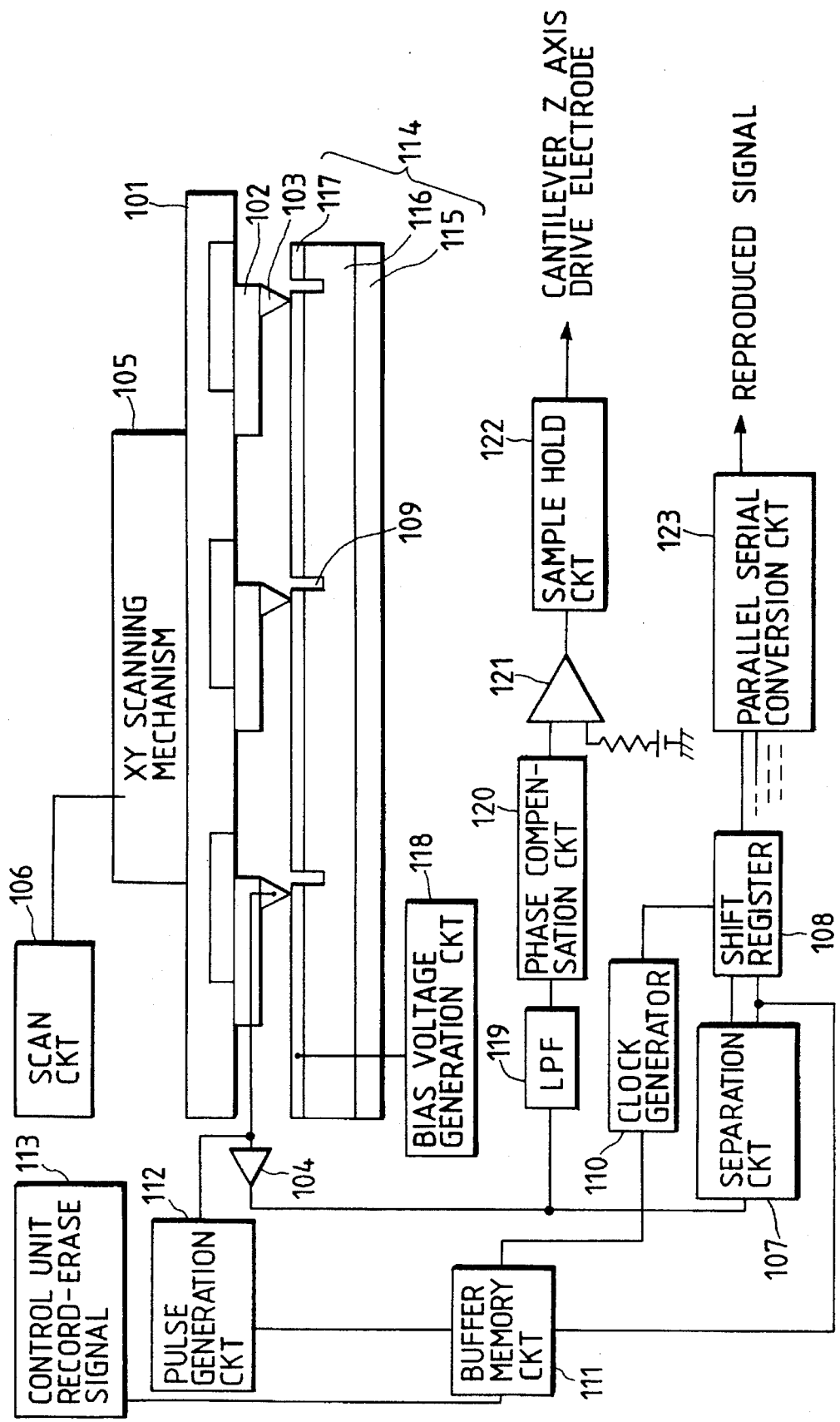
FIG. 1 is a block diagram of an embodiment of the present invention.

FIG. 1 shows the configuration of an information processing (recording-reproducing) apparatus, provided with multiple probes, of the present invention. The information processing apparatus of the present embodiment employs plural probes 103 for detecting the tunnelling current and a recording medium 114 opposed thereto.

In the following there will be explained the present embodiment, with reference to FIG. 1.

The multi-probe head is provided with plural probes 103, each of which is composed of a tip of a height of 5 μm, formed by electron beam deposition carbon or the like, on the end of a piezoelectric bimorph cantilever supported at an end, as disclosed in the U.S. Pat. No. 4,912,822. The probe 103 is provided with an actuator, drivable in three directions, prepared for example by anisotropic etching on a Si substrate 101.

The entire multi-probe head is put into scanning motion, in X- and Y-directions by an XY scanning mechanism 105, by means of a triangular scanning signal generated by a scanning circuit 106.

In the reproducing operation, when the chip on each probe passes a tracking groove 109 in the scanning motion, the tunnelling current varies according to the shape of the groove, thereby providing a detection signal as shown in FIG. 2A along with the scanning operation. The signal is separated, by a position signal-information signal separation circuit 107, into an information signal as shown in FIG. 2B and a position signal indicating the tracking groove, as shown in FIG. 2C. In the present embodiment, the separation can be achieved simply by separating the positive and negative components of the signal as shown in FIG. 2A followed by binary digitizing, since the position signal is generated in the decreasing direction of the detection signal while the information signal is generated in the increasing direction of the detection signal.

Figure 6:
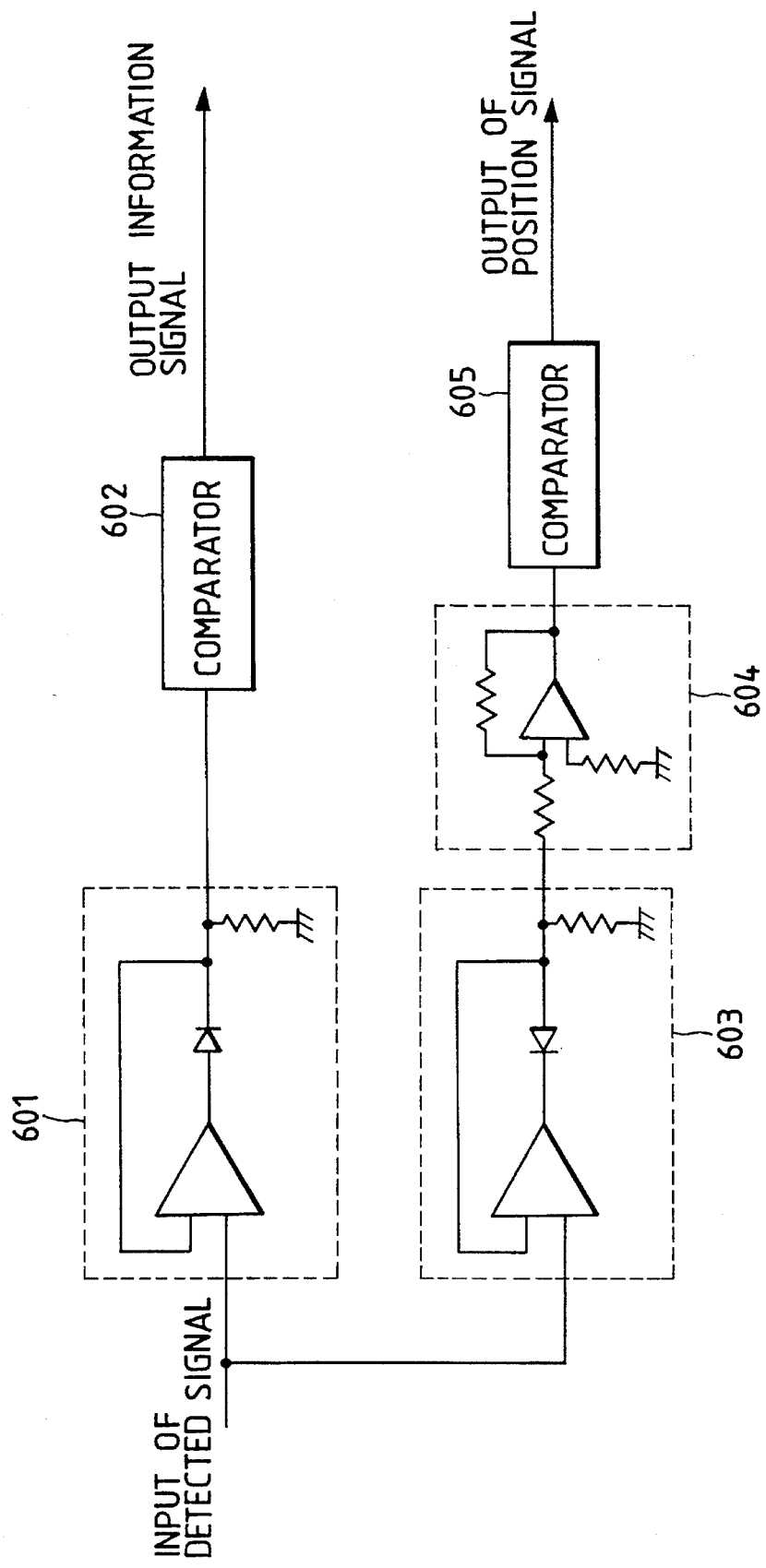
FIG. 6 is a diagram showing the details of the separation circuit shown in FIG. 1.

More specific circuit configuration is shown in FIG. 6.

In this circuit the input signal is divided into two, one of which is guided through a positive rectifying circuit 601 to obtain the information signal component only. The signal is binary digitized by a comparator 602 to provide the information signal as shown in FIG. 2B. The other is transmitted through a negative rectifying circuit 603 to extract the position signal component only. It is transmitted by an inverter 604, and is binary digitized by a comparator 605 to provide a signal as shown in FIG. 2C.

The storage timing of a shift register 108 is so selected that the initial data of an information signal train is stored in the memory, based on the phase relationship between the position signal and the clock signal from a reference clock generator 110, more specifically, in the present embodiment, at the downshift timing of the first reference clock signal (FIG. 2B) counted from the downshift of the position signal.

This operation is conducted for each probe, so that the memory for each probe can store data independent from the aberration in the detection timings of the position signals among different probes.

Then, there will be explained the recording or erasure of information. In the recording or erasing operation, when the tip on each probe starts to scan on the tracking groove 109, there is obtained a detection signal (FIG. 2E) of the tunnelling current varying according to the shape of the groove, thus containing the positional information only.

The signal is separated as the position signal, by the position signal-information signal separation circuit 107.

The output timing of a buffer memory circuit 111 is so selected that a recording pulse is generated by a pulse generator 112 corresponding to the initial data of a recording information signal train, based on the phase relationship between the position signal and the reference clock signal, more specifically at the downshift timing of a first reference clock signal counted from the downshift of the position signal.

Consequently, a buffer memory circuit 111, storing the recording data for each probe, can output the data with a timing independent of the fluctuation in the detection timings of the position signals among the probes.

The frequency of the reference clock signal is so selected as to satisfy a relation:

$$\text{one cycle} < (\text{pit diameter formed by application of recording pulse/probe scanning speed perpendicular to tracking groove})$$

In this operation, binary recording or erasing signals are stored in advance in the buffer memory circuit 111, by a record-erase signal control unit 113.

The recording medium 114 is formed, on a flat substrate obtained by cleavage of mica, by epitaxially growing Au, and laminating thereon two layers of an LB film of squarilium-bis-6-octylazulene (hereinafter represented as SOAZ), having electric memory effect. Thus, the recording medium 114 is composed of a substrate 115, a lower electrode 116 and a recording layer 117.

On the recording medium 114, tracking grooves of a width of 100 nm are formed by FIB (field ion beam), with a pattern shown in FIG. 3.

Figure 4:
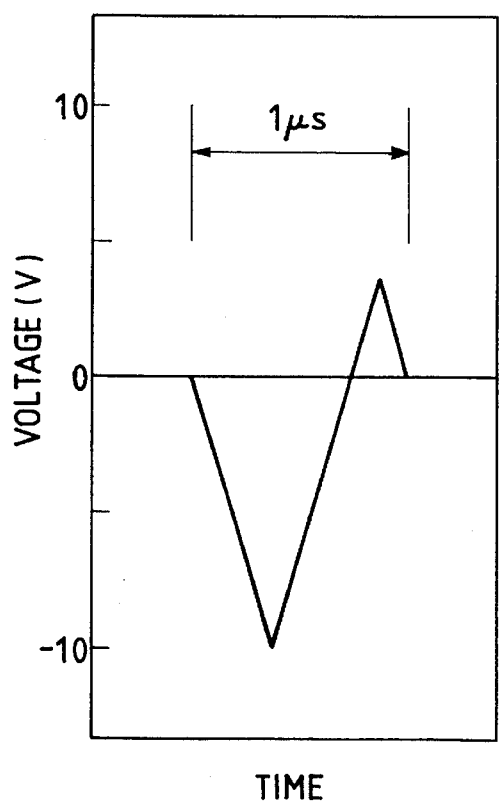
FIG. 4 is a waveform chart showing a signal recording voltage generated by the bias voltage generation circuit shown in FIG. 1.
Figure 5:
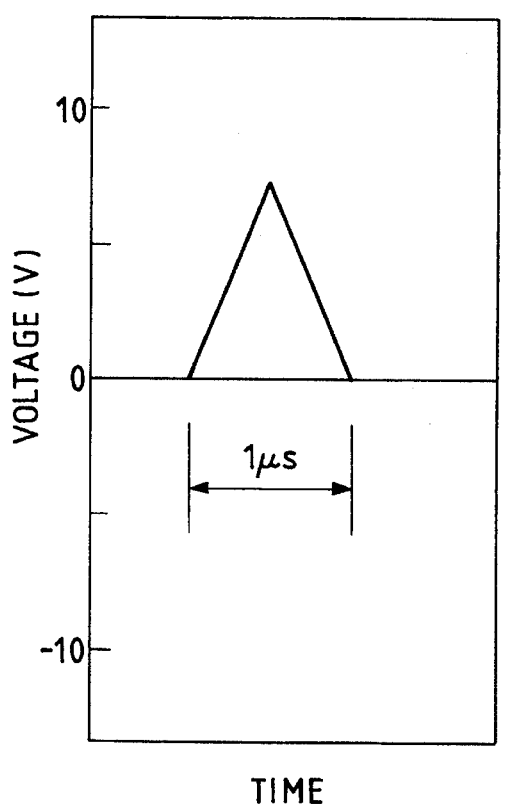
FIG. 5 is a waveform chart showing a signal erasing voltage generated by the bias voltage generation circuit shown in FIG. 1.

The recording layer of this recording medium, having a memory effect for the voltage-current switching characteristics, can achieve recording by a pulse voltage of the form shown in FIG. 4, or erasure by a pulse voltage of the form shown in FIG. 5, applied between the probe and the recording medium. Also in the reproducing operation, there is applied a voltage in the order of 100 mV not inducing a change in the memory state of the recording layer, and the data 1 or 0 is identified by the difference in the conductance of the recording layer.

Also the binary signals from the probes are collected by a parallel-serial conversion circuit 123, then converted into serial signals and output as reproduced signal. Although there is shown only one input signal to the parallel-serial conversion circuit 123, the reproduced signals from the probes are in fact collected thereto.

The distance control between each probe and the recording medium is executed in the following manner. Normally, a bias voltage of about 100 mV is applied between the two by a bias voltage generation circuit 118, and the two are brought close to a state, by the control of the cantilever in the Z-direction, where a current of about 2 nA flows. The current detected by the probe 103 is converted, by an I/V conversion circuit 104, into a voltage signal, which passes a low-pass filter (LPF) 119 of a cut-off frequency approximately equal to the scanning frequency in order to enable tracing only to the component lower than the low frequency component of the detected current signal in the scanning operation, generated for example by the inclination of the substrate. It is then transmitted by a phase compensation circuit 120, and an operational amplifier 121 determines the difference from an offset voltage, in order to maintain a constant average distance between the two. The signal transmitted by these circuits is used in the feedback control of the cantilever in the Z-direction.

Also in the recording operation, a sample-hold circuit 122 is maintained in the hold state in order to maintain a constant distance between the probe electrode and to avoid collision of the two by the feedback control.

What is claimed is:

1. An information processing apparatus for effecting at least one of recording and reproducing of information with probes on a recording medium having tracking grooves, comprising:

a probe head having plural probes;

moving means for moving said probe head relative to said recording medium;

signal detection means for detecting, from each of said probes, a detected signal based on a physical phenomenon between each said probe and said recording medium;

extraction means for extracting a position signal, indicating a position of said tracking groove, from said detected signal;

reference clock generation means for generating a reference clock signal; and timing determination means for determining a start timing of recording or reproduction of said information, based on the phase relationship between said position signal and said reference clock signal.

2. An apparatus according to claim 1, wherein said physical phenomenon is tunnelling effect.

3. An apparatus according to claim 1, further comprising separation means for separating information signal based on said information from said detected signal.

4. An apparatus according to claim 3, further comprising storage means for storing said information signal, based on the timing of reproduction determined by said timing determination means.

5. An apparatus according to claim 1, further comprising voltage application means for applying a voltage between said recording medium and said probe.

6. An apparatus according to claim 5, wherein the recording of said information is executed by application of a recording voltage between said recording medium and said probe by said voltage application means.

7. An information processing method for effecting at least one of the recording and reproduction of information with probes on a recording medium having tracking grooves, comprising the steps of:

moving a probe head having plural probes relative to said recording medium;

detecting, from each of said probes, a signal based on a physical phenomenon between each said probe and said recording medium;

extracting a position signal, indicating a position of said tracking groove, from the detected signal;

generating a reference clock signal; and determining a start timing of reproduction or recording of said information, based on the phase relationship between said position signal and said reference clock signal.

8. An apparatus according to claim 1, wherein said timing determination means determines the start timing of recording or reproduction of said information, based on the reference clock signal's downshift timing which first appears after said position signal is extracted by said extraction means.

9. A method according to claim 7, wherein the start timing of recording or reproduction of said information is determined in said timing determining step, based on the reference clock signal's downshift timing which first appears after said position signal is extracted in said extracting step.

10. An information processing apparatus for effecting at least one of recording and reproducing of information with probes on a recording medium having tracking grooves, comprising:

a probe head having plural probes;

moving means for moving said probe head relative to said recording medium;

signal detection means for detecting, from each of said probes, a detected signal based on a physical phenomenon between each said probe and said recording medium;

extraction means for extracting a position signal, indicating a position of said tracking groove, from said detected signal;

reference clock generation means for generating a reference clock signal; and timing determination means for determining a start timing of recording or reproduction of said information, based on the reference clock signal after said position signal is extracted by said extraction means.

11. An information processing method for affecting at least one of the recording and reproduction of information with probes on a recording medium having tracking grooves, comprising the steps of:

moving a probe head having plural probes relative to said recording medium;

detecting, from each of said probes, a signal based on a physical phenomenon between each said probe and said recording medium;

extracting a position signal, indicating a position of said tracking groove, from the detected signal;

generating a reference clock signal; and determining a start timing of recording or reproduction of said information, based on the reference clock signal after said position signal is extracted in said extracting step.

* * * * *

UNITED STATES PATENT AND TRADEMARK OFFICE
CERTIFICATE OF CORRECTION

PATENT NO. : 5,526,334
DATED : June 11, 1996
INVENTORS : AKIHIKO YAMANO ET AL.

It is certified that error appears in the above-identified patent and that said Letters Patent is hereby corrected as shown below:

COLUMN 1

Line 24,   "Tunnelling" should read --tunnelling--.

COLUMN 2

Line 23,   "10" should be deleted.

COLUMN 5

Line 4,   "10" should be deleted.

COLUMN 6

Line 6,   "tunnelling" should read --a tunnelling--.

Signed and Sealed this

Seventeenth Day of December, 1996

Attest:

BRUCE LEHMAN

*Attesting Officer*     *Commissioner of Patents and Trademarks*